May 31, 1938.                M. E. SHAVER                2,119,505
                       CAR TRUCK BRAKE MECHANISM
                   Original Filed Aug. 17, 1934    3 Sheets-Sheet 1
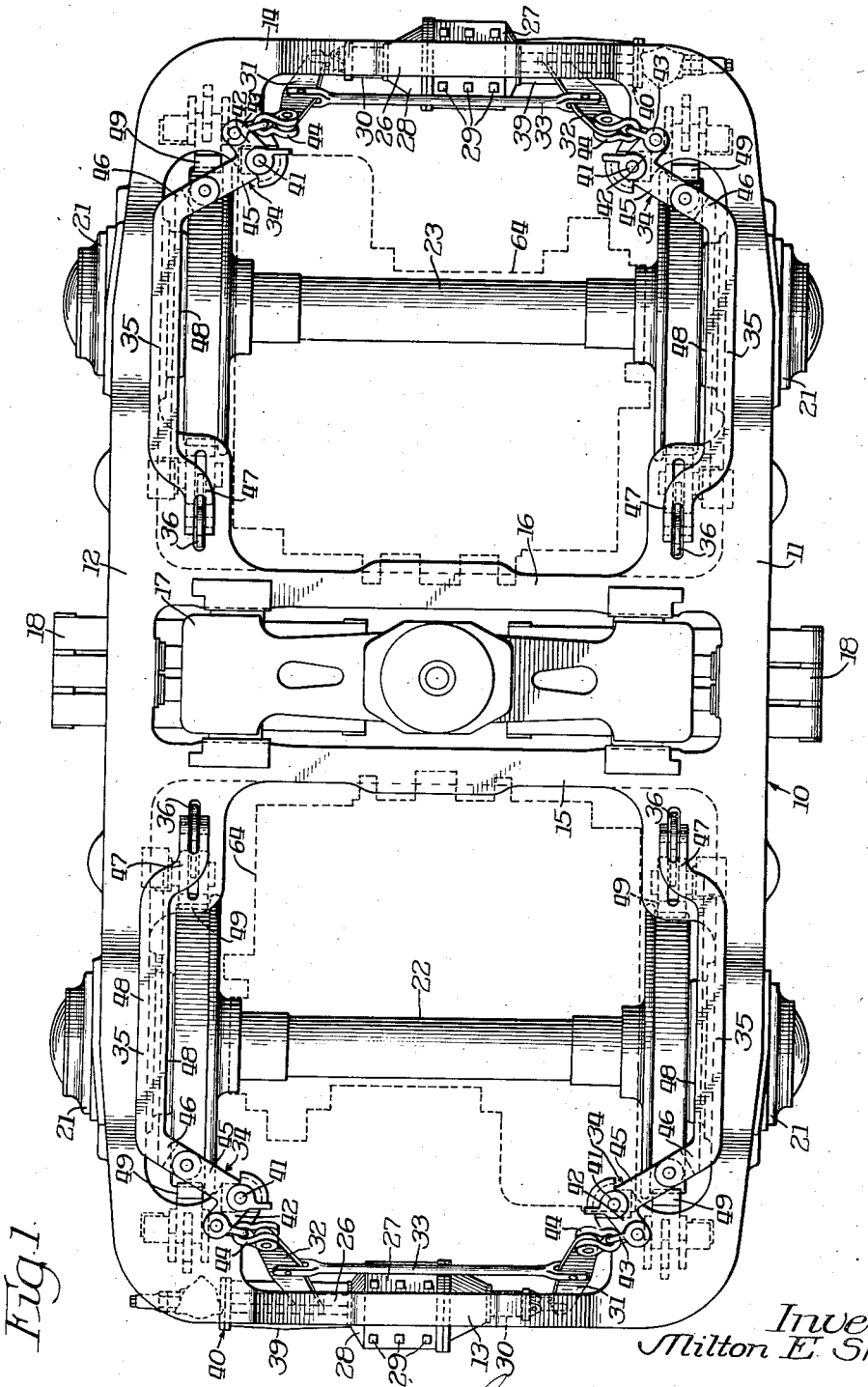
Inventor
Milton E. Shaver
By Tillson, Mann & Cox Attys

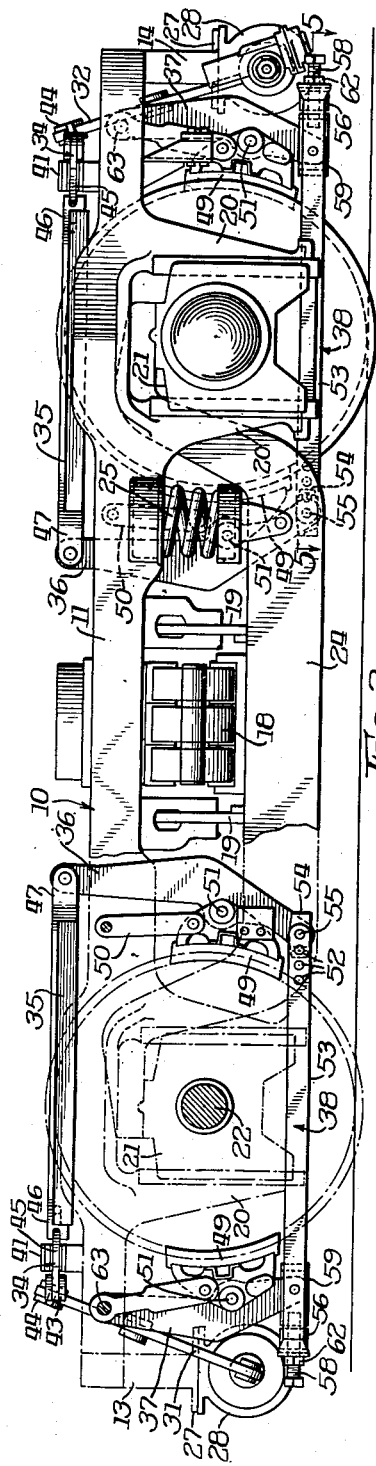

May 31, 1938.  M. E. SHAVER  2,119,505
CAR TRUCK BRAKE MECHANISM
Original Filed Aug. 17, 1934  3 Sheets-Sheet 3
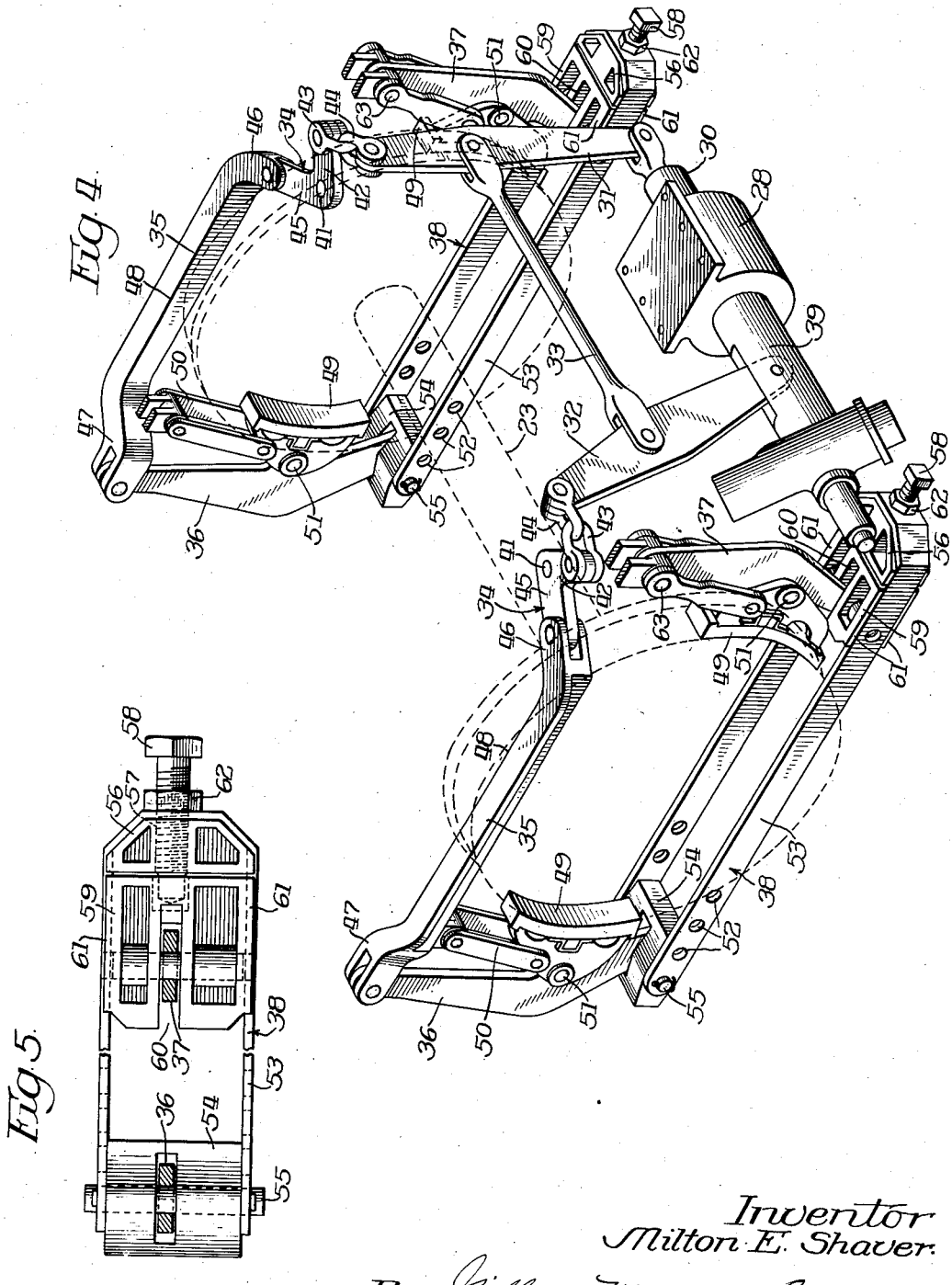
Inventor
Milton E. Shaver.
By Gillson, Mann & Cox, Attys Patented May 31, 1938

2,119,505

UNITED STATES PATENT OFFICE 2,119,505

CAR TRUCK BRAKE MECHANISM

Milton E. Shaver, Chicago, Ill., assignor to Pullman-Standard Car Manufacturing Company, Chicago, Ill., a corporation of Delaware Application August 17, 1934, Serial No. 740,318
Renewed October 27, 1937

24 Claims. (Cl. 188—56)

This invention relates to car trucks, particularly those equipped with traction motors, and the principal object of the invention is to provide such trucks with brake rigging which does not interfere in any way with truck movement; which has a minimum number of parts and, consequently reduces weight and cost to a minimum; which is arranged so that traction motors may be mounted on the truck without fouling the brake rigging; and which affords convenience to inspection and repair.

Further and other objects and advantages will become apparent as the disclosure proceeds and the description is read in conjunction with the accompanying drawings, in which Fig. 1 is a diagrammatic, plan view of a truck made in accordance with this invention;

Figs. 2 and 3 are side and end elevational views, respectively, of the same;

Fig. 4 is a perspective view of the brake rigging associated with each axle of the truck; and Fig. 5 is a sectional view taken on the line 5—5 of Fig. 2.

Although a preferred embodiment of the invention has been chosen for illustration and description, it will be understood that the invention may be embodied in many other forms, and the appended claims should be construed as broadly as the prior art will permit.

Referring now to the drawings, it will be seen that the car truck comprises a truck frame, generally designated 10, cast in one piece, and including side frames 11 and 12 joined together at their ends by end sills 13 and 14, and intermediate their ends by transoms 15 and 16. A truck bolster 17 rests upon elliptical springs 18 which in turn are carried by a spring plank, (not shown) suspended by swing hangers 19 from the side frames 11 and 12. As the supporting means for the truck bolster is more or less conventional, no further description is believed necessary.

Side frames 11 and 12 are equipped with pedestal arms 20 which slidably engage the sides of journal boxes 21, as best shown in Fig. 2. The truck frame is mounted on wheeled axles 22 and 23 with equalizer bars 24 carrying the truck load through coil springs 25. The ends of the equalizer bars rest on the journal boxes 21, as usual.

The end sills have a center drop 26, as best shown in Fig. 3, equipped with a horizontal web 27 to which a brake cylinder 28 is adapted to be secured by bolts 29. The brake cylinders are mounted parallel to the end sills and each has a push rod 30 which connects with the truck brake rigging to apply the brakes to the wheels.

Each axle has its own brake cylinder and brake rigging, the latter consisting of a live cylinder lever 31, a dead cylinder lever 32, a tie rod 33, bell cranks 34, links 35, live truck levers 36, dead truck levers 37, and bottom connections 38.

The cylinder levers lie inside of the end sill and are in substantially vertical position, the fulcrum 39 of the dead cylinder lever being adjustable by means of an automatic slack adjuster 40 of conventional type. It will be understood that when the travel of the push rod exceeds a predetermined amount due to wear of the brake shoes, the slack adjuster 40 automatically shifts the fulcrum of the dead cylinder lever and corrects the slack in the brake rigging.

The bell cranks 34 are pivoted by pins 41 to upstanding bosses located at the four corners of the truck frame, and the short arm 42 of each bell crank is connected by clevises 43 and 44 to the upper end of one of the cylinder levers. The other arm 45 of each bell crank is connected to the link 35 which consists of a bar of more or less T-shape cross section, terminating in jaws 46 and 47 and having a laterally offset portion 48 to enable the link to be kept at the lowest possible level on the truck and still clear the wheels.

The brake shoes 49 are suspended by brake hangers 50 from the side frames 11 and 12 (see Figs. 3 and 4) and are applied to the wheels whenever the short arms 42 of the bell cranks 34 are pulled inwardly. The live and dead truck levers 36 and 37 are pivoted to the brake shoes by pins 51 and the bottom ends of the levers are joined by the connecting bars 38 which are provided with a plurality of alined holes 52 for roughly adjusting the angularity of the truck levers. The connecting bar consists of a yoke 53, the open end of which receives a block 54 to which the lower end of the live truck lever is secured by a pin 55 which also secures the block 54 to the yoke. The other end of the yoke is equipped with a smaller block 56 provided with a tapped hole 57 adapted to receive an adjusting bolt 58 which bears against a cross head block 59 having a vertical slot 60 receiving the lower end of the dead truck lever 37. The cross head block 59 has top and bottom flanges 61 which ride on the yoke 53 so that when finer adjustments of the angularity of the truck levers is desired, the bolt 58 may be taken up to effect the adjustment. A lock nut 62 maintains the adjustment.

The top of the dead truck lever 37 is conveniently fulcrumed on the pin 63 which also serves to support the brake hangers from the corners of the truck frame.

The brake rigging just described is well suited for use on car trucks which are equipped with traction motors, outlines of which are indicated by dotted lines at 64 in Fig. 1. The brake rigging affords ample space for the traction motors and is extremely compact. This latter fact is important in all classes of railway equipment where it is essential to keep centers of gravity as low as possible, and reduce weight. The arrangement of the brake rigging is such that movement of the truck relative to the car body, as well as movement between the truck frame and the axles, is not interfered with by the rigging.

A further advantage inherent in the brake rigging is that it is conveniently reached for inspection and repair, all parts being located on the outer portions of the truck frame.

What I claim is:—

1. In a car truck, a truck frame including side frames joined at their ends by end sills, wheeled axles journaled between the side frames, a brake cylinder mounted on each end sill, brake rigging associated with each cylinder for applying braking pressure to the wheeled axles, said rigging including bell crank levers pivoted at the four corners of the truck frame.

2. In a car truck, a truck frame including side frames joined at their ends by end sills, wheeled axles journaled between the side frames, a brake cylinder mounted on each end sill, brake rigging associated with each cylinder for applying braking pressure to the wheeled axles, said rigging including bell crank levers pivoted at the four corners of the truck frame, and cylinder levers occupying a substantially vertical position adjacent to the end sills.

3. In a car truck, a truck frame including side frames joined at their ends by end sills, wheeled axles journaled between the side frames, a brake cylinder mounted on each end sill, brake rigging associated with each cylinder for applying braking pressure on the wheeled axles, said rigging including bell crank levers pivoted at the four corners of the truck frame, and cylinder levers lying inside of the end sills and occupying a substantially vertical position adjacent to the end sills.

4. In a car truck, a truck frame including side frames connected at their ends by end sills, a brake cylinder mounted on one of the end sills and extending parallel therewith, a push rod in the cylinder and brake rigging adapted to be actuated by the push rod, said rigging including cylinder levers mounted in approximately vertical position adjacent to the end sill which supports the brake cylinder.

5. In a car truck, a truck frame including side frames connected at their ends by end sills, a brake cylinder mounted on one of the end sills, a push rod in the cylinder, and brake rigging adapted to be actuated by the push rod, said rigging including cylinder levers mounted in approximately vertical position adjacent to the end sill which supports the brake cylinder, vertically arranged truck levers alongside the side frames, and means including a bell crank lever for connecting the cylinder levers to the truck levers.

6. In a car truck having wheeled axles equipped with traction motors, a truck frame including side frames connected by end sills and transoms and having openings on opposite sides of the transoms for the traction motors, and independent brake rigging for each of said axles, said rigging including cylinder levers mounted in substantially vertical position adjacent to one of the end sills and truck levers alongside the side frames.

7. In a car truck, a truck frame including an end sill, a brake cylinder mounted on the end sill, brake rigging associated with the cylinder and including cylinder levers mounted adjacent to the end sill in substantially vertical position, and a horizontal connecting link having a laterally offset center portion.

8. In a car truck, a truck frame including side frames joined at their ends by end sills, wheeled axles for supporting said frame, brake mechanism for said truck, said mechanism including vertical truck levers at the front and rear of the wheels of one of said axles, a link means for connecting the lower ends of said levers at each side of the car, said means comprising a bifurcated link having portions on each side of the wheel, means for adjusting the length of said link, and a cylinder arranged transversely of the truck for operating said mechanism.

9. In a car truck, a truck frame having an end sill provided with a depressed center portion, brake mechanism for said truck, said mechanism comprising vertically arranged cylinder and truck levers, brake shoes on said truck levers, and a brake cylinder mounted on the depressed portion of the end sill beneath the same for operating said mechanism.

10. In a brake arrangement, the combination of a truck frame including spaced side frames connected adjacent the ends thereof by end rail members, and connected intermediate said end rail members by spaced transom members, wheel and axle assemblies disposed in supporting relation to said truck frame and between an end rail member and the adjacent transom member, a dead and live truck lever disposed on opposite sides of a wheel, a connection between said truck levers extending below the axle, and operating means for said levers extending transversely of said truck and operating in a transverse direction to control said brakes.

11. In a brake arrangement, the combination of a truck frame including a side frame, end rail members and spaced transom members, wheels supporting said truck frame, brake rigging having cooperative relation to one of said wheels, said rigging including brake levers disposed on opposite sides of said wheel, a connection between said levers and below the wheel center, a bell crank pivoted to said truck frame and connected to one of said brake levers, and a transversely disposed brake cylinder operatively connected to said bell crank.

12. In a brake arrangement, the combination of a truck frame including a side frame, end rail members and spaced transom members, wheels supporting said truck frame, brake rigging having cooperative relation to one of said wheels, said rigging including brake levers disposed on opposite sides of said wheel, a connection between said levers and below the wheel center, a bell crank pivoted to said truck frame and connected to one of said brake levers, and a transversely disposed brake cylinder supported on one of said end rail members and operatively connected to said bell crank.

13. In a brake arrangement, the combination of a truck frame including a side frame, end rail members and spaced transom members, wheels supporting said truck frame, brake rigging having cooperative relation to one of said wheels, said rigging including brake levers disposed on opposite sides of said wheel, a connection between said levers and disposed below the wheel center, a dead truck lever operatively connected to one of said brake levers, and a transversely disposed brake cylinder supported on one of said first named members and operatively connected to said dead truck lever.

14. In a brake arrangement, the combination of a truck frame including a side frame, end rail members and spaced transom members, wheels supporting said truck frame, brake rigging having cooperative relation to one of said wheels, said rigging including brake levers disposed on opposite sides of said wheel and in the plane thereof, one of said brake levers being a dead lever and the other of said brake levers being a live lever, a connection between said levers disposed below the wheel center, a dead lever operatively connected to the live brake lever, and a transversely disposed brake cylinder supported on said truck frame and operatively connected to said last named dead lever.

15. In a brake arrangement, the combination of a truck frame including a side frame, end rail members and spaced transom members, wheels supporting said truck frame, brake rigging having cooperative relation to one of said wheels, said rigging including brake levers disposed on opposite sides of said wheel, a connection between said levers disposed below the wheel center, a dead lever operatively connected to one of said brake levers, and a transversely disposed brake cylinder supported on said truck frame and operatively connected to said dead lever.

16. In a brake arrangement, the combination of a truck frame including a side frame, end rail members and spaced transom members, wheels supporting said truck frame, brake rigging having cooperative relation to one of said wheels, said rigging including brake levers disposed on opposite sides of said wheel, one of said brake levers being a dead lever and the other of said brake levers being a live lever, a connection between said levers disposed below the wheel center, a dead lever operatively connected to the live brake lever, and a transversely disposed brake cylinder supported on said truck frame and operatively connected to said last named dead lever.

17. In a brake arrangement, the combination of a truck frame including side frame members and a transverse connecting member, wheels supporting said truck frame, brake rigging adapted to have braking cooperation with one of said wheels, said rigging including brake levers disposed on opposite sides of said wheel, a connection between said levers below the wheel centers, a substantially horizontally disposed frame lever connected at one end to one of said brake levers, a horizontally disposed brake cylinder supported on said truck frame below said frame lever, and a cylinder lever connected to the piston of said cylinder at one end of said lever and connected at the other end to the free end of said frame lever.

18. In a brake arrangement, the combination of a truck frame including side frame members and a transverse connecting member, wheels supporting said truck frame, brake rigging adapted to have braking cooperation with one of said wheels, said rigging including brake levers disposed on opposite sides of said wheel and in the plane thereof, a connection between said levers below the wheel center, a substantially horizontally disposed frame lever connected at one end to one of said brake levers, a horizontally disposed brake cylinder supported on said truck frame below said frame lever, and a cylinder lever connected to the piston of said cylinder at one end of said lever and connected at the other end to the free end of said frame lever.

19. In a brake arrangement, the combination of a truck frame including side frame members and transverse connecting members, wheels supporting said truck frame, brake rigging adapted to have braking cooperation with one of said wheels, said rigging including brake levers disposed on opposite sides of said wheel and in the plane thereof, one of said levers being a dead lever and the other of said levers being a live lever, a connection between said levers below the wheel center, a substantially horizontally disposed frame lever pivoted at one end to the upper end of said live brake lever, a horizontally disposed brake cylinder supported on said truck frame below said frame lever, and a cylinder lever connected to the piston of said cylinder at one end of said lever and connected at the other end to the free end of said frame lever.

20. In a brake arrangement, the combination of a truck frame including side frame members and a transverse connecting member, wheels supporting said truck frame, brake rigging adapted to have braking cooperation with one of said wheels, said rigging including brake levers disposed on opposite sides of said wheel and in the plane thereof, one of said levers being a dead lever and the other of said levers being a live lever, a connection between said levers below the wheel center, a substantially horizontally disposed frame lever pivoted at one end to the upper end of said live brake lever, a horizontally disposed brake cylinder supported on said truck frame below said frame lever, a cylinder lever connected to the piston of said cylinder at one end of said lever and connected at the other end to the free end of said frame lever, and a pivot for said cylinder lever intermediate the piston connected to said cylinder lever and the frame lever connected to said cylinder lever.

21. In a brake arrangement, the combination of a truck frame including side frame members and a transverse connecting member, wheels supporting said truck frame, brake rigging adapted to have braking cooperation with one of said wheels, said rigging including brake levers disposed on opposite sides of said wheel, a connection between said levers below the wheel centers, a substantially horizontally disposed frame lever pivoted at one end to one of said brake levers, a horizontally disposed brake cylinder supported on said truck frame below said frame lever and disposed to operate transversely of said truck frame, and a cylinder lever connected to the piston of said cylinder at one end of said lever and connected at the other end to the free end of said frame lever.

22. In a brake arrangement, the combination of a truck frame including side frame members and a transverse connecting member, wheels supporting said truck frame, brake rigging adapted to have braking cooperation with one of said wheels, said rigging including brake levers disposed on opposite sides of said wheel and in the plane thereof, a connection between said levers below the wheel center, a substantially horizontally disposed frame lever pivoted at one end to one of said brake levers, a horizontally disposed brake cylinder supported on said truck frame below said frame lever and disposed to operate transversely of said truck frame, and a cylinder lever connected to the piston of said cylinder at one end of said lever and connected at the other end to the free end of said frame lever.

23. In a brake arrangement, the combination of a truck frame including side frame members and a transverse connecting member, wheels supporting said truck frame, brake rigging adapted to have braking cooperation with one of said wheels, said rigging including brake levers disposed on opposite sides of said wheel and in the plane thereof, one of said levers being a dead lever and the other of said levers being a live lever, a connection between said levers below the wheel center, a substantially horizontally disposed frame lever pivoted at one end to the upper end of said live brake lever, a horizontally disposed brake cylinder supported on said truck frame below said frame lever and disposed to operate transversely of said truck frame, and a cylinder lever connected to the piston of said cylinder at one end of said lever and connected at the other end to the free end of said frame lever.

24. In a brake arrangement, the combination of a truck frame including side frame members and a transverse connecting member, wheels supporting said truck frame, brake rigging adapted to have braking cooperation with one of said wheels, said rigging including brake levers disposed on opposite sides of said wheel and in the plane thereof, one of said levers being a dead lever and the other of said levers being a live lever, a connection between said levers below the wheel center, a substantially horizontally disposed frame lever pivoted at one end to the upper end of said live brake lever, a horizontally disposed brake cylinder supported on said truck frame below said frame lever and disposed to operate transversely of said truck frame, a cylinder lever connected to the piston of said cylinder at one end of said lever and connected at the other end to the free end of said frame lever, and a pivot for said cylinder lever intermediate the piston connected to said cylinder lever and the frame lever connected to said cylinder lever.

MILTON E. SHAVER.